United States Patent [19]

Arrasmith

[11] 4,327,665
[45] May 4, 1982

[54] METHOD AND APPARATUS FOR COATING COMPOSITION ON CAN SEAMS

[76] Inventor: Clemens Arrasmith, 5919 Sarah Ct., Carmichael, Calif. 95608

[21] Appl. No.: 60,331

[22] Filed: Jul. 26, 1979

[51] Int. Cl.³ .......................... B05C 15/00; F26B 3/30
[52] U.S. Cl. .......................................... 118/666; 34/4; 118/64; 118/642; 118/712
[58] Field of Search ............ 427/55, 239, 286, 388 R; 118/642, 666, 712, 64; 34/4, 21

[56] References Cited

U.S. PATENT DOCUMENTS

| | | | |
|---|---|---|---|
| 2,355,459 | 8/1944 | Miskella | 34/4 |
| 2,420,399 | 5/1947 | New | 34/4 |
| 2,616,549 | 11/1952 | Ornitz | 118/64 |
| 2,846,972 | 8/1958 | Bofinger | 118/317 |
| 3,068,119 | 12/1962 | Gotsch | 427/55 |
| 3,733,709 | 5/1973 | Bassemir et al. | 34/4 |
| 3,995,075 | 11/1976 | Cernaukas et al. | 427/239 |
| 4,070,499 | 1/1978 | Ramler et al. | 427/54.1 |

*Primary Examiner*—John H. Newsome
*Attorney, Agent, or Firm*—Mark C. Jacobs

[57] ABSTRACT

An apparatus and method for curing coatings applied to can seams during manufacturing the cans on a can assembly line. The method includes placing the cans on a conveyor then exposing the coatings on the cans to infrared radiation from a plurality of serially arranged lamp modules as the cans are moved on the conveyor. The apparatus for carrying out the method includes a conveyor, a variable speed motor for driving the conveyor and a plurality of independently controlled, variable intensity, infrared lamp modules positioned serially along the length of the conveyor. By adjusting the speed of the conveyor and the intensity of each lamp module, the temperature profile at which the coatings are cured can be adjusted in accordance with the characteristics of the particular coating. Adjustment of the height of the module above the can will also affect the curing temperature profile.

35 Claims, 21 Drawing Figures

METHOD AND APPARATUS FOR COATING COMPOSITION ON CAN SEAMS

BACKGROUND OF THE INVENTION

This invention relates specifically to a method and apparatus for curing the coating applied to a can along the seam formed during fabrication of a cylindrical can from a rectangular sheet of can material.

In conventional assembly line methods of manufacturing cans, such as those in which a consumable product is to be packaged, a rectangular sheet of tinplated material is formed into a cylindrical or tubular shape. The ends of the sheet formed into the tubular shape are abutted, crimped, and bonded together as by welding or soldering, so as to form a seam along the entire length of the cylindrical can. The bonding of the sheet ends during the forming of this seam destroys the tin plating and exposes the underlying material. In order to prevent the underlaying material, which may contain toxic substances, from contaminating the product to be packaged, a coating, e.g. vinyl, enamel, is applied to the seam, usually on the inside of the cylindrical can, but often on the outside.

After the coating has been applied to the seam such as by painting or by electrostatic techniques and before further fabrication of the can proceeds, specifically before consumable products are packaged in the can, the coating must be cured, i.e. heated to a specific temperature for a specific period of time. Many other substances, including lacquers and epoxies, may be used as coatings depending upon the particular type of can material in use and the particular product to be packaged in the can. Each of these various types of coatings has its own curing characteristics and must thus be heated to a relatively precise temperature for a specific period of time.

The curing characteristics of some of the coating substances require that the coating be maintained at various levels of temperature for specific periods of time and that it be heated at a precise rate. Improper curing of the coating can result, for example, in boiling off of a portion of the coating if it is a liquid, in overdrying and cracking, or, in the case of low viscosity liquid substances, running of the coating away from the seam.

In one prior art technique, cans which have had their seams coated are placed in a curing furnace, heated by gas or electricity. The furnace raises the temperature of the entire can to a fixed temperature for a period of time sufficient to cure the coating. Because the entire can is heated in the furnace, vasts amounts of energy are wasted. Not only is a significant amount of time required to raise or lower the temperature within the furnace, for the batch processing, but shifting the processing for various can sizes is impossible, and coatings that require precise temperature profiles cannot be accomodated.

The continous process technique of this invention avoids these and other shortcomings attributable to prior art processes and apparatuses used for this purpose.

SUMMARY OF THE INVENTION

The present invention provides an apparatus and method for curing coated welded can seams which eliminates the disadvantages inherent in conventional curing methods. The invention permits directional application of heat energy to a specific segment of the can proximate the can seam, thereby minimizing the energy required to cure the coating and eliminating the need for using natural gas as an energy source. Rapid temperature changes are possible, thus permitting the curing of different types of coating substances, including those requiring heating at a specific rate to various levels of temperature. The invention is specifically intended for use with welded can seams.

Broadly, the invention comprises generating a pattern of infrared radiation and directing that generated radiation to a relatively isolated area of the cans proximate the can seam as the cans are advanced along the can assembly line.

The radiation applied to the seam is derived from a plurality of independently controlled infrared lamp modules. The intensity of the radiation emitted from each module and the exposure time of the seam to the radiation is adjusted according to the curing characteristics of the coating material.

For a fuller understanding of the nature and advantages of the invention, reference should be made to the ensuing detailed description taken in conjunction with the accompanying drawings.

DESCRIPTION OF PREFERRED EMBODIMENTS

Figure 1:
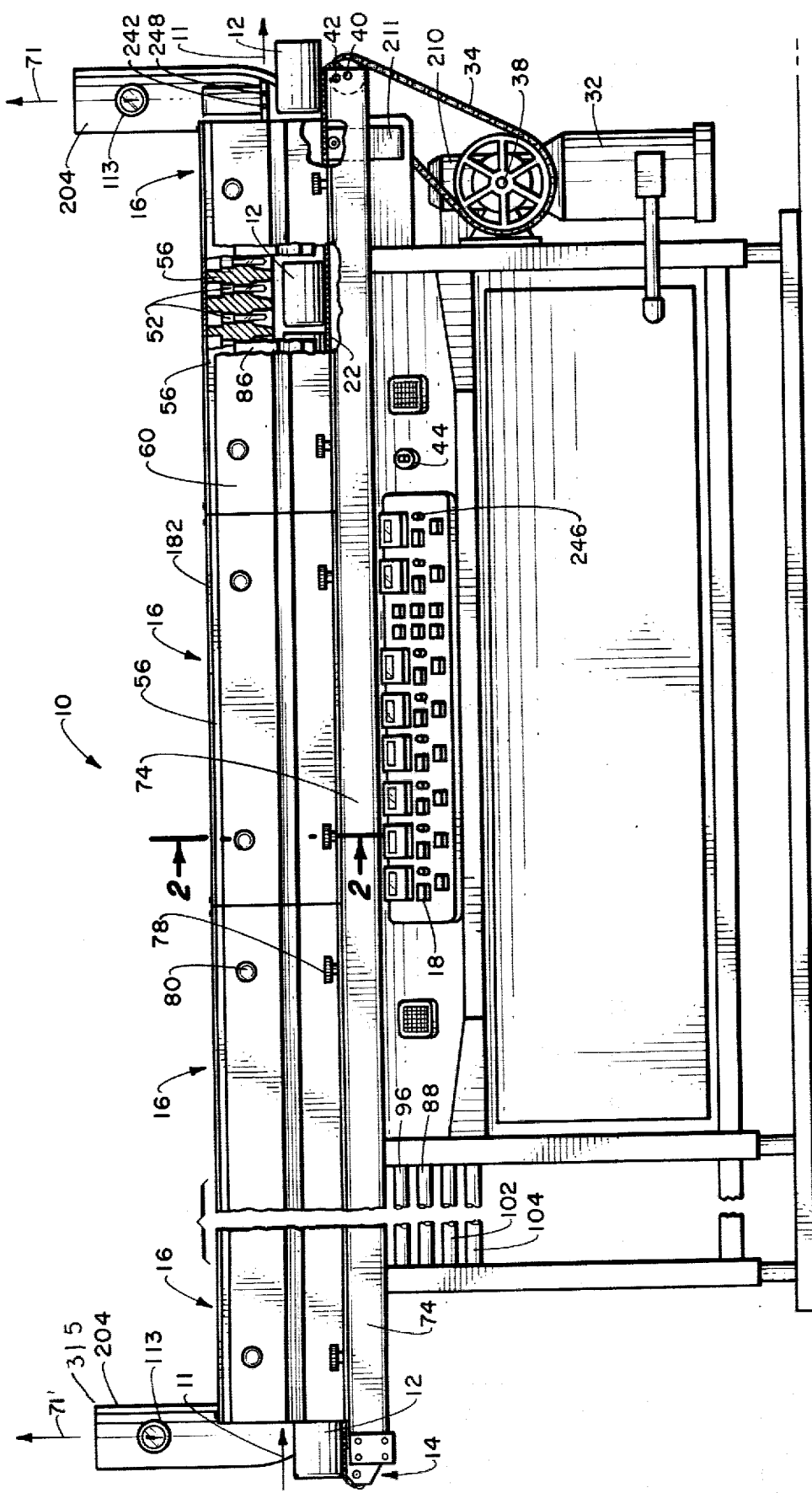
FIG. 1 is a side view of the plurality of infrared lamp modules, the conveyor for the cans and the control panel.

The present invention pertains to a technique for curing a coating on a can seam by exposing the seam to a pattern of infrared radiation, the exposure time and nature of the pattern depending on the curing characteristics of the specific coating.

The radiation is derived from a plurality of infrared lamp modules serially positioned preferably at a station on the assembly line immediately after the station where the coating is applied to the can seam. The infrared lamp modules, each of which comprises generally a bank of infrared lamps, a reflector proximate each lamp for directing the radiation into a beam, and lamp and adjusting means for focusing the beam onto segments of the moving cans near the seam, are arranged mutually adjacent one another and aligned so that the directed radiation beams are generally mutually parallel.

Each bank of infrared lamps is independently controlled by a silicon-controlled rectifier located between a power supply and the lamps. A potentiometer associated with each bank of infrared lamps allows for any preselected voltage to be applied to the lamps. Since the temperature of the filament of an infrared lamp is proportional to the voltage applied to it, the provision of means for selecting the voltage to each bank of lamps independently permits selection of the intensity of radiation generated by each bank of lamps and thus selection of the temperature achieved by the can segment at each of the lamp modules along the assembly line. In addition to the independent voltage control of each bank of lamps, a master potentiometer electrically coupled to all of the banks of infrared lamps allows a fixed change of voltage to be applied to all of the lamps so as to increase or decrease the radiation intensity of all of the lamps by a predetermined amount. Thus, a predetermined temperature curve can be created by suitable adjustment of the potentiometers associated with each bank of lamps and the entire curve can be raised or lowered by suitable adjustment of the master potentiometer.

The cans with the newly formed seam and the newly applied coating are preoriented with their cylindrical axes horizontal and seams facing the radiation source. The cans are then proceeded successively by a conveyor along the assembly line beneath the plurality of lamp modules in a direction generally transverse to the directed radiation beams. In most instances the coating is applied to the can seam on the interior of the can, but in certain cases the coating may be applied to the seam on the exterior of the can. The conveyor includes magnetic means for maintaining the horizontally oriented cans in like position as they move through the radiation beams so that the seams of all of the cans are oriented towards the infrared lamps so as to be exposed to the radiation. The conveyor for moving the cans past the lamp modules is driven by a motor whose speed may be varied so as to vary the time period during which the cans are exposed to the radiation.

Means are also provided for cooling the infrared lamps, for removing gases and other volatiles produced by the heated coating, for sensing the temperature of the cans proximate the seam, for automatically terminating operation of the lamps and the conveyor in the event the current to any of the banks of lamps falls below a preselected minimum level and for measuring radiation exposure time based on conveying speed.

In operation, the specific substance used as the coating determines the type of curing curve required. Accordingly, the voltage applied to each bank of lamps is preselected so as predetermine the temperature which the can segments will realize as they pass through the radiation beams of each bank of lamps. This preselection of voltage, which is accomplished by the potentiometers associated with each bank of lamps, creates a predetermined temperature profile for the can seam as the cans are advanced past the lamp modules.

Preferably by adjusting the distance between the lamp and the can seam, the lamps are focused so as to isolate the directed radiation beam to a specific segment of the cans in the region of the can seam. The speed of the moving conveyor is also preselected so as to determine the exposure time of the cans.

Thus, as the cans with their seams positioned towards the infrared lamps are passed through the radiation beams, the can seam and the coating thereon are subjected to various levels of heat, each level being associated with a specific lamp module. In the more common instance where the coating is on the interior of the can, heat is conducted from the exterior. While the invention will be hereinafter described in an embodiment wherein the cans are horizontally oriented and with the radiation source above the can in one version and below the can in another version, it will be appreciated that it is within the purview of this invention to orient the radiation source to provide sidewise radiation of the can through the can wall and seam to the coating using a vertically moving can conveyor mechanism. As the cans are moved completely past all of the operating lamp modules, the can seam and the coating thereon will have been subjected to a gradual increase in temperature, a gradual decrease in temperature, or any preselected temperature profile, depending upon the curing characteristics of the particular type of coating material in use. After passage through the radiation beams, the coating on the can seam is primarily completely cured and the cans may then be moved to the next station in the can assembly line. The term "operating modules" is used because not all of the modules may be required for curing a specific coating. Thus if the apparatus includes six modules, in some instances only five or less may be required to provide the radiation for a particular cure.

If it is desired to alter the shape of the temperature profile experienced by the can seam, any one or more of the potentiometers may be used to change the voltage applied to the respective bank of lamps in each module, thereby immediately changing the intensity of radiation generated by those lamps and thus the temperature profile. If it is desired to either increase or decrease the level of heat created by all of the lamps, the master potentiometer may be used to increase or decrease the voltage applied to all of the lamps by a fixed amount, thereby increasing or decreasing the temperature profile by a fixed incremental amount. The increasing or decreasing of the radiation generated by the lamps by means of the potentiometers is facilitated by a temperature sensor located at the exit of that specific modular tunnel. The can temperature proximate the seam is sensed by the temperature sensors and displayed on suitable meters, so that the potentiometers may be easily varied until the desired can seam temperature is achieved at each lamp module. These potentiometers may be manually or automatically controlled in a feed back loop.

Also, if it is determined that the exposure time should be altered so as to improve the curing process, conveyor speed and can exposure time may be changed as desired. For example, by slowing the conveyor the exposure time will be increased.

The lamps are cooled during operation by the passage of coolant through ducts located in each lamp module. Volatile products from the coating created by the heat are removed from the region of the lamps by means of forced air directed to the can seam from around the lamps.

In the event of a current drop to any of the banks of lamps, means are provided for either signalling a warning or for terminating the operation of the lamps and the conveyor.

Referring first to FIG. 1 the curing apparatus 10 is shown at a station on the can assembly line. The cans which have had their seams newly coated with a polymer or other coating substance are advanced along the assembly line in succession for entry into curing apparatus 10 in the direction indicated by arrows 11, as shown by the arrow above can 12. For the reasons more fully explained below, before can 12, and all following cans, enter curing apparatus 10 of the present invention, they are prepositioned so that the seams are pointed in a like upward direction to receive the radiation, which in this instance is from above. The positioning of the cans is readily accomplished by any can orienting apparatus available in the marketplace. One mode of can orientation is discussed below with respect to FIG. 8.

The curing apparatus 10 comprises generally means for conveying the cans along the assembly line, such as a motor-driven conveyor 14, a plurality of mutually adjacent infrared lamp modules, such as infrared lamp module 16, at least one can seam temperature sensor, such as sensor 18, means for controlling the voltage to each infrared lamp module so as to control the intensity of radiation generated, and means for controlling the speed of conveyor 14 so as to control the duration of exposure.

Figure 2:
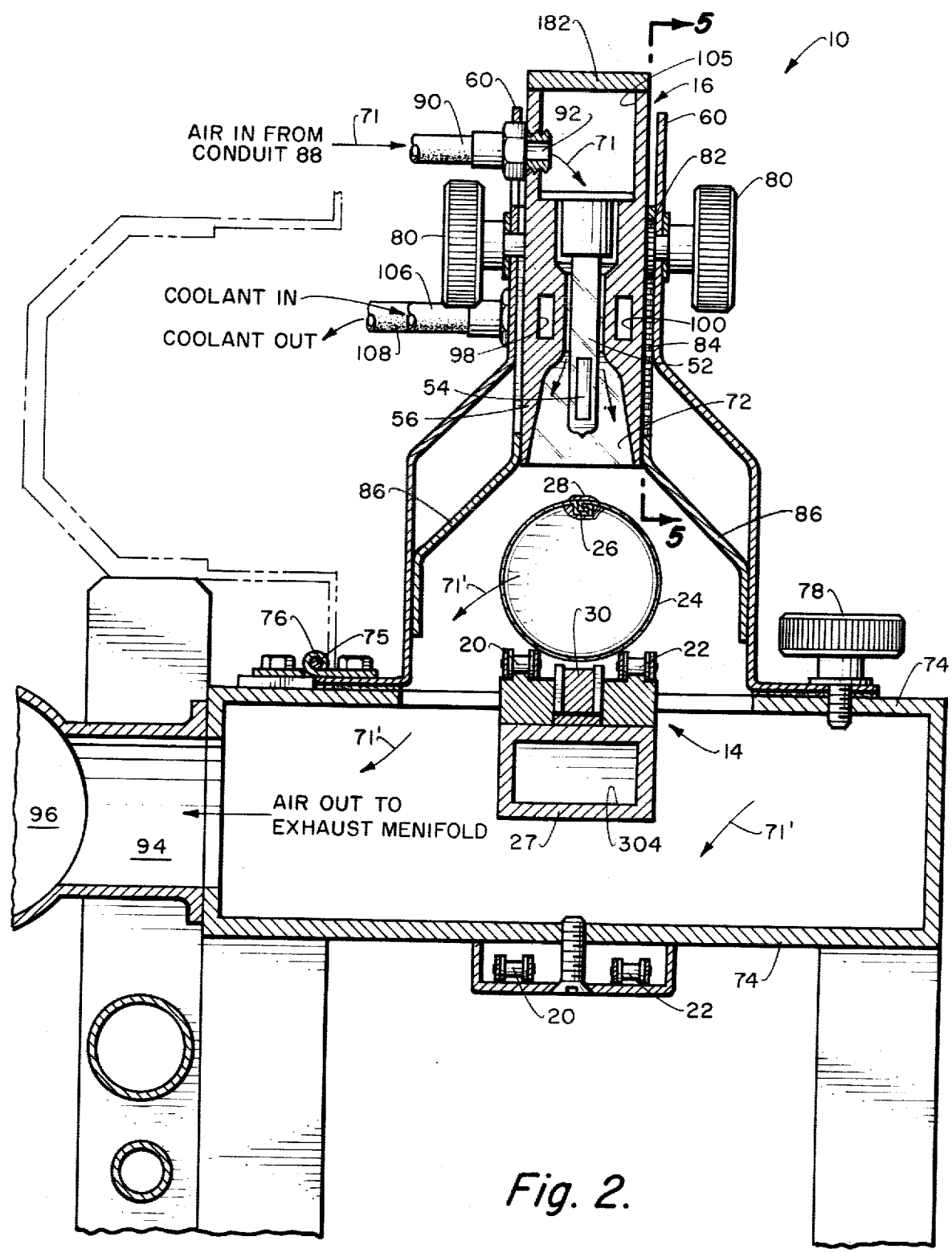
FIG. 2 is a sectional view of section 2—2 of FIG. 1, of one embodiment of one of the infrared lamp modules and the conveyor supporting a can with the cam seam oriented towards the infrared lamps.
Figure 4:
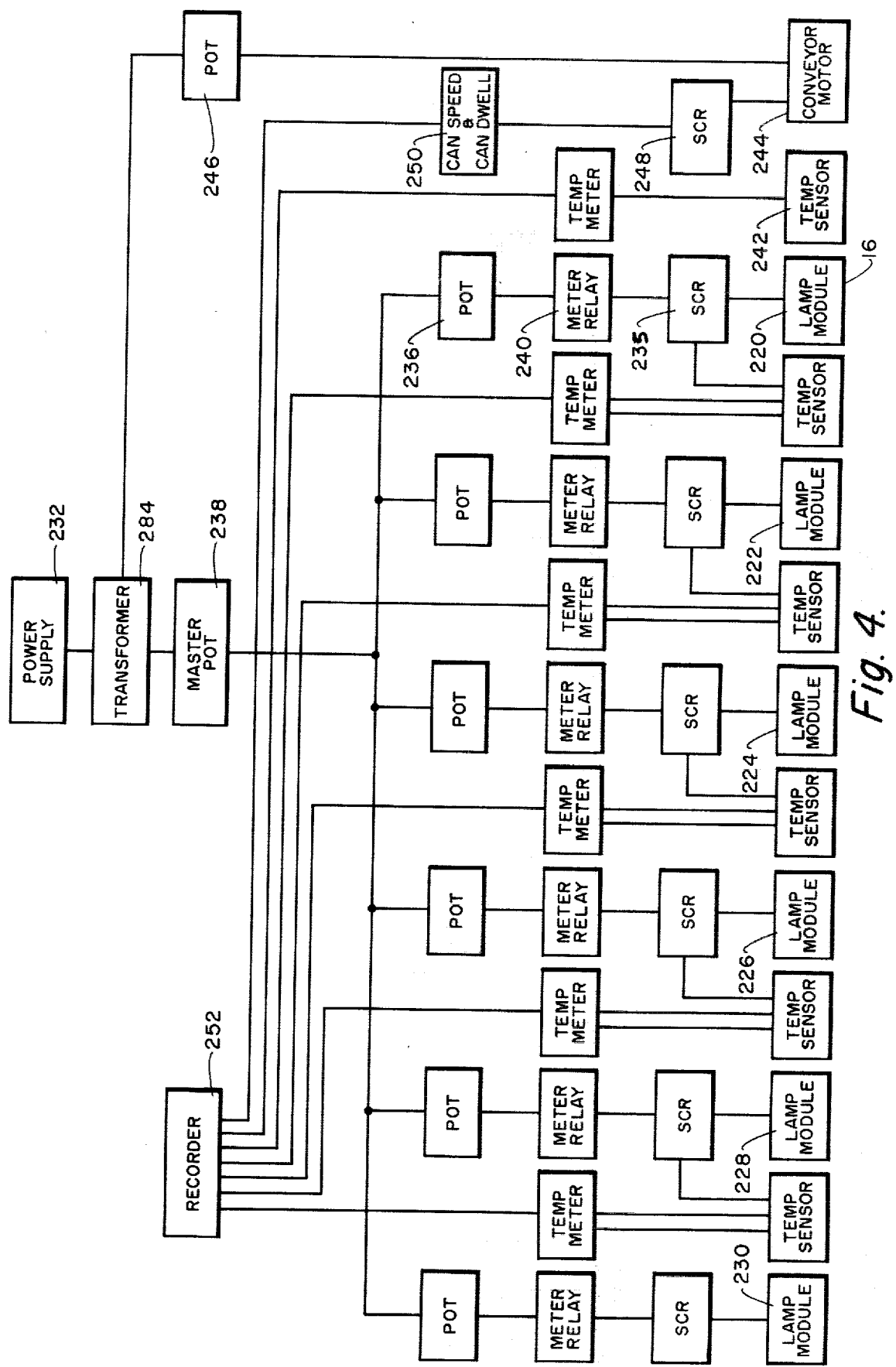
FIG. 4 is a block diagram of the curing apparatus.

Referring now to FIGS. 1, 2 and 4, the conveyor 14 comprises generally a pair of continuous chains 20 and 22 for supporting the horizontally-oriented cans, such as can 24 having a seam 26 with coating 28 thereon, a magnetic bar 30 extending the entire length of the curing apparatus 10 for maintaining the cans in position so that the can seams point in a like upward direction, and a motor 32 for driving the chains 20,22, preferably via drive chain 34 interconnecting a gear (not seen) on speed reducer 210, which is driven by motor shaft 38, and a gear 40 on shaft 42 which supports chain drive gears (not shown). A potentiometer 246 electrically coupled to motor 32 permits the speed of conveyor 14 to be varied.

Figure 3:
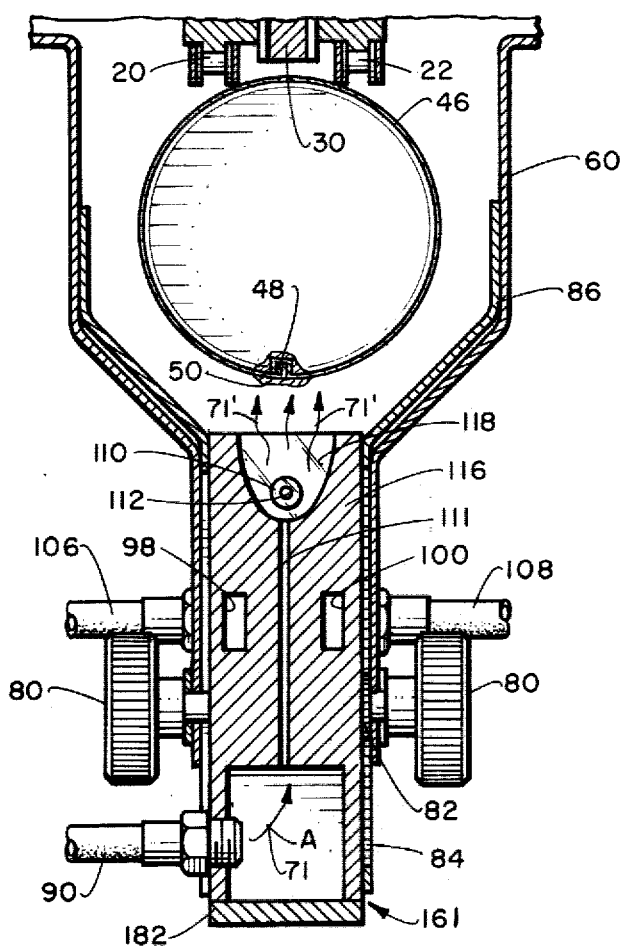
FIG. 3 is a sectional end view of an alternative embodiment of one of the infrared lamp module illustrating a can supported from above.

While the embodiment depicted in FIGS. 1 and 2 illustrates supporting can 24 from below by chains 20 and 22 and directing radiation downward onto can seam 26, it is possible to support the cans, such as can 46 as seen in FIG. 3, from above by magnetic bar 30 and direct the radiation upward onto can seam 48 having coating 50 thereon. This latter embodiment has the advantage of minimizing the flow of coating substance away from can seam 48 which may occur when substances of low viscosity are used.

Figure 6:
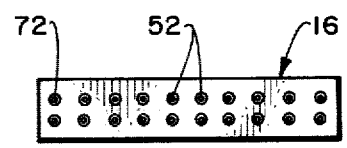
FIGS. 6 and 7 are bottom plan views of typical lamp arrangements employed with this invention.
Figure 7:
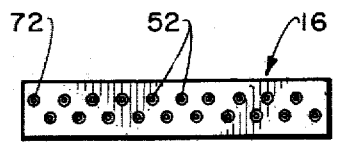

The infrared lamp modules are serially arranged in a mutually adjacent manner on the can assembly line. In one embodiment, as depicted in FIGS. 1 and 4, there are six lamp modules, each module having a bank of twenty individual infrared lamps. The lamps may be arranged in rows of twos as shown in FIG. 6 or staggered as shown in FIG. 7. A typical lamp module, such as lamp module 16, is illustrated in detail in FIGS. 2 and 3 and comprises generally a bank of individual infrared lamps such as lamp 52 arranged as shown in FIG. 2; each lamp having a filament 54; a reflector 56 proximate lamp 52 for directing radiation generated by lamp 52 into a beam, a lamp module height adjusting means, such as geared wheel 80, and an outer shroud 60 confining the lamps and reflectors in module 16.

Referring to FIGS. 4, 6 & 7, the bank of lamps in each lamp module, such as the bank of lamps 52 in module 16, is controlled by a silicon controlled rectifier (SCR) 234 between the lamp module 16 and the power supply 232. A potientiometer 68 electrically coupled to the lamps in lamp module 16 enables the voltage applied to the lamp filaments to be varied. Additionally, a master potentiometer 44 may be electrically coupled to all of the infrared lamp modules for increasing or decreasing the voltage of all the lamp modules by a like amount. Thus, the entire temperature curve can either be raised or lowered.

Referring to FIG. 2, lamp 52 is a conventional infrared lamp, such as a quartz tungsten lamp. The reflector 56 surrounding lamp 52 is preferably constructed of a block of aluminum having a generally elliptically shaped cavity 72 surrounding filament 54 of lamp 52. A single block of aluminum extending along the length of lamp module 16 may provide reflecting cavities for all the lamps in lamp module 16. Thus the voltage applied to the filaments in one module can be changed independent of the voltage applied to any other module. Thus, a temperature curve or profile can be selected in accordance with the specific coating. The surface of reflector 56 in the region of cavity 72 is preferably highly polished so as to reflect most of the radiation generated by lamp 52. Alternatively, reflector 56 surrounding lamp 52 may be constructed of a substance which possesses a low coefficient of thermal expansion, such as glass rock. The design of cavity 72 is discussed infra.

The shroud 60 which confines the lamps and reflectors in lamp module 16 is hingedly connected to a channel 74 which generally surrounds conveyor chains 20 and 22. The hinged shroud 60 permits lamp module 16 to be rotated about hinge pin 76 to open that section of the curing apparatus 10 so that in the event of malfunction of conveyor 14, access to the cans in that section is possible. During the curing process, lamp module 16 is in position as illustrated in FIG. 2 and is secured to channel 74 by a hinge pin 76 on one side and by a locking bolt 78 on the opposite side. Thus shroud 60 of lamp module 16 and channel 74 generally define a confined region surrounding the conveyor chains 20 and 22 and the moving cans, such as can 24. This confined region defines a tunnel which extends the length of the curing apparatus 10. The hinging capability also provides ready access to the plurality of lamps 52. These lamps are available in varying wattages, such as 500,750 and 1000, thereby providing yet another variable for the determination of the time-temperature curves to be used with any particular can size and/or coating composition. Since chains 20 and 22 may elongate, it is beneficial to employ a spring takeup 211 interconnected to said chains to avoid any high temperature caused problems.

Figure 5:
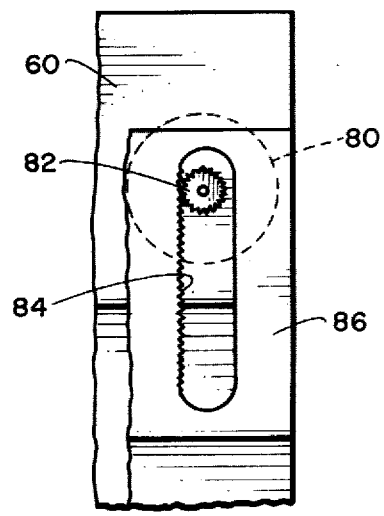
FIG. 5 is a view of section 5—5 of FIG. 2.

Referring to FIGS. 2 and 5, the means for adjusting the height of lamp module 16 above the can 24 supported on the conveyor chains 20, 22 is illustrated. A wheel 80 is connected to pinion gear 82 which engages the gear teeth on a rack 84 formed on plate 86. As wheel 80 is rotated, both reflector 56 surrounding lamp 52 and lamp 52 are moved vertically. As should be apparent, the thumb wheel 80 connected to pinion gear 82 which engages rack 84 permits not only the accommodation of various sizes of cans, e.g. can 12 of FIG. 1, can 24 of FIG. 2 and can 46 of FIG. 3 respectively, but also the focusing of the radiation beam directed by reflector 56 onto a particular segment of can 46 proximate the seam 48.

Also provided on each lamp module, such as module 16, are means for removing gases which may be produced by the heated coating on the can seam. Preferably, this gas removal means comprises conduit 88 (FIG. 1) connected to hose 90 (FIG. 2) for the passage of air, and means for introducing the air 71 under pressure (not shown) through conduit 88 and hose 90. Conduit 88 fluidly communicates with an opening 92 in the upper portion of reflector 56. The opening 92 is also in fluid communication with cavity 72, and into the region of the can seam 26 where gases are produced. The air and gases 71' are passed out of the curing apparatus 10 via the interior of channel 74, outlet 94 and outlet conduit 96 (FIG. 2).

It should be seen that the air sweep is provided to remove what is termed outgassing, that is, volatiles that are evolved from the curing of the stripe compositions due to heat. If not removed they could adhere to the lamp envelope and be detrimental thereto.

Figure 10:
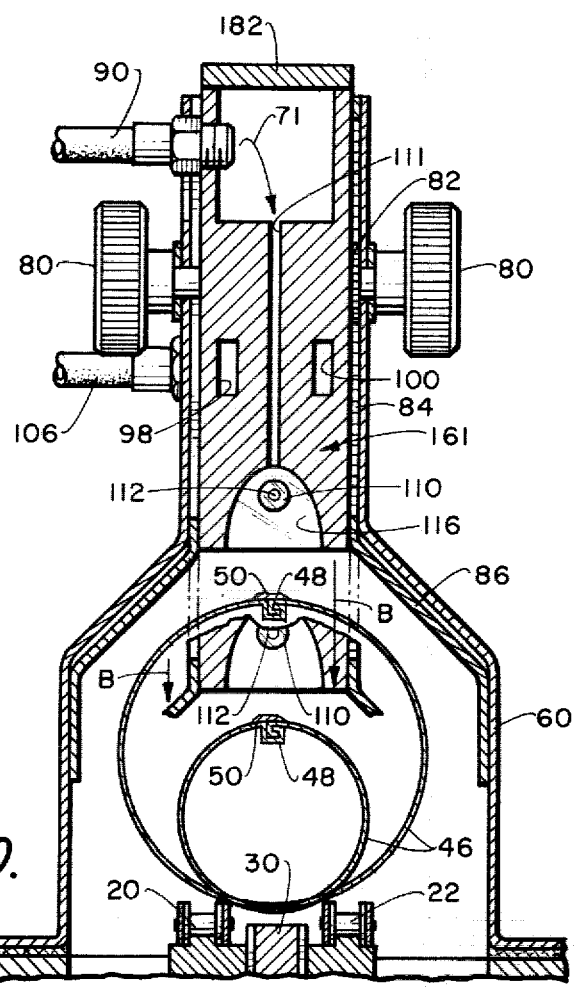
FIG. 10 is a sectional end view of an embodiment of this invention employing an alternate style lamp and illustrating a modification to the module for cooling said lamp.

FIG. 10 is an end view of one of the infrared modules and the conveyor supporting a can, similar to FIG. 2 wherein the module is disposed above the conveyor. However, this embodiment employs a module 161 having a double ended horizontally disposed quartz halide lamp 110 within reflector 116, similar to the lamp 110 shown in FIG. 3. The balance of the features of the embodiment of FIG. 3 are discussed elsewhere herein.

The FIGS. 10 and 2 embodiments both feature upward and downward adjustability of plates 86, and the other parts of the module associated therewith, with respect to shroud 60, this adjustability being designated by arrow B of FIG. 10. This adjustability to accomodate cans of varying sizes is emphasized in FIG. 10 by the presence of the superimposed cans 46. When the larger one is being cured the plate 86 has its outwardly directed sections abutting those of shroud 60.

Whereas, when the smaller can 46, designated a size 211, can as opposed to the size 401 can for the larger one depicted here, is to be cured, plate 86 is moved downwardly to a position relative to shroud 60 as is shown in the fragmented inset view adjacent half of the arrow B pointed downward. Thus, in FIG. 10 the viewer sees two lamps 110 and filaments 112 and portions of plate 86.

All of the other aspects of the embodiment of FIG. 10 are discussed elsewhere, they being similar to those in FIG. 2.

Figure 14:
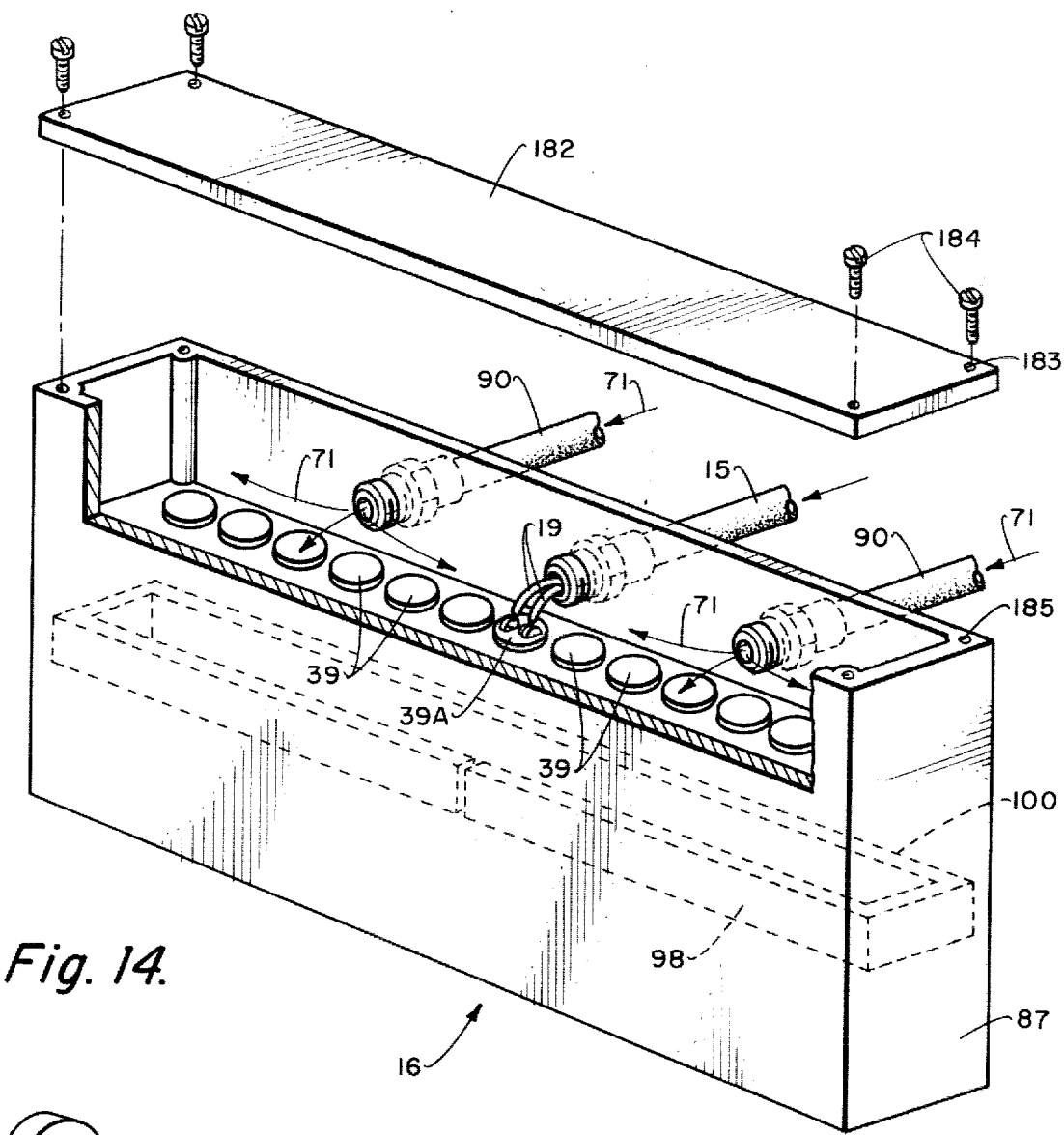
FIG. 14 is a perspective view of the module shown in FIG. 2 with the cover removed.

FIG. 14 is a top perspective view of module 16, with cover 182 removed. In this view neither shroud 60 nor plate 86 are depicted for ease of understanding. Coolant water cavities 98 and 100 are shown in phantom only with respect to their relative location of end wall 87. Coolant water hose 90 is visable in this view. Note further that conduit 15 for the lamp wiring as drawn contains only a pair of wires 19 for attachment to one specific socket 39A. Other socket wires are omitted.

The balance of the lamp sockets are used to hold the quarts halide lamps employed in the embodiment of FIG. 2 and also designated 39. Module cover 182 is attached to the body of the module 16 at the corners thereof by suitable bolts 184 through apertures 183 into boss 185.

Figure 16:
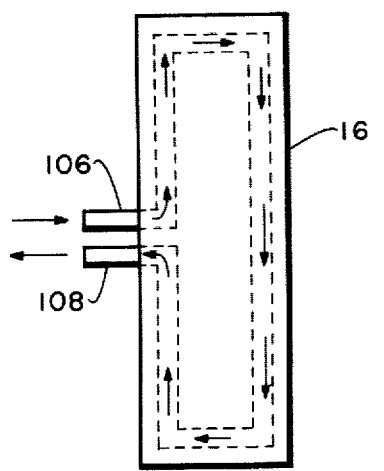
FIG. 16 is a top plan view showing the flow path of the coolant in FIG. 2.

Means for cooling the lamps are also provided on each lamp module and shown in FIGS. 2 and 3. Preferably the cooling means comprises ducts 98, 100 within reflector 56 and extending the length of module 16 so as to be in proximity to all the lamps in module 16, coolant main inlet conduit 102, and main outlet conduit 104 (FIG. 1). Main inlet conduit 102 connects to inlet hose 106 which is in fluid communication with duct 98. Duct 100 is connected to duct 98 at both ends of module 16 and is in fluid communication with outlet hose 108. Thus a complete path is provided for passing coolant, e.g. water, from a supply (not shown) around all of the lamps in module 16. These interconnections are not seen in FIG. 2. See also FIG. 16. The coolant (water) is designated 95.

Figure 17:
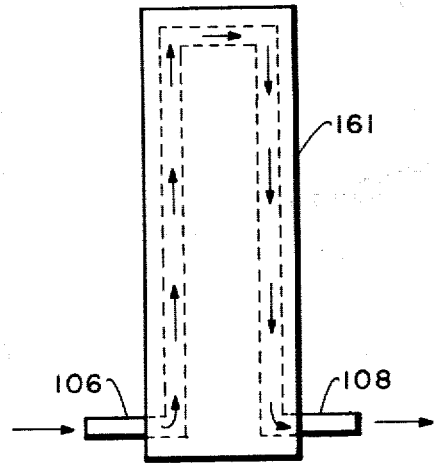
FIG. 17 is a top plan view of the coolant path in the embodiment of FIG. 3.

Thus water or other coolant passes leftwardly from the point of input through hose 106 to duct 98. The coolant passes through a connecting duct not seen, rightwardly to duct 100, turns rightwardly to the forward part of the module, then rightwardly across the former connecting duct, and finally rightwardly back through duct 98 to its point of egress through hose 108. Water enters at ambient temperature and leaves quite warm. Since the input and output points on the duct 98 are spaced apart only about 0.025 inches, i.e. the distance between the two hose connections, maximum cooling can take place through this general C shaped cooling means. Other cooling paths such as FIG. 17 for the FIG. embodiment can be used.

Figure 11:
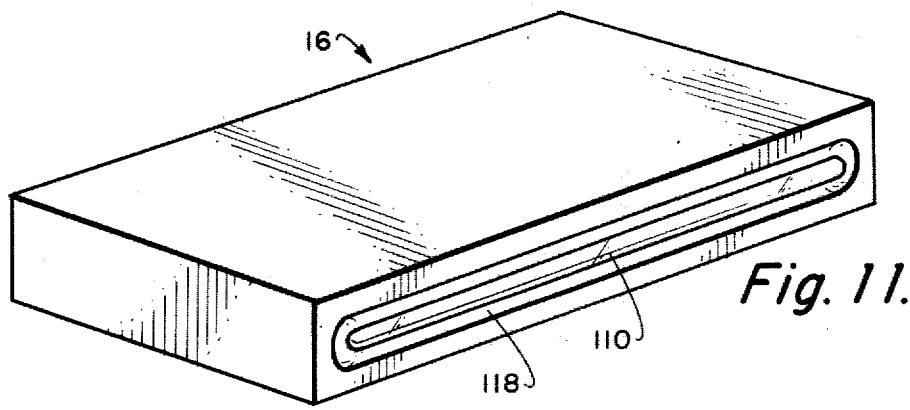
FIG. 11 is a bottom perspective view of a portion of a lamp module employing one parallel tubular lamp.
Figure 12:
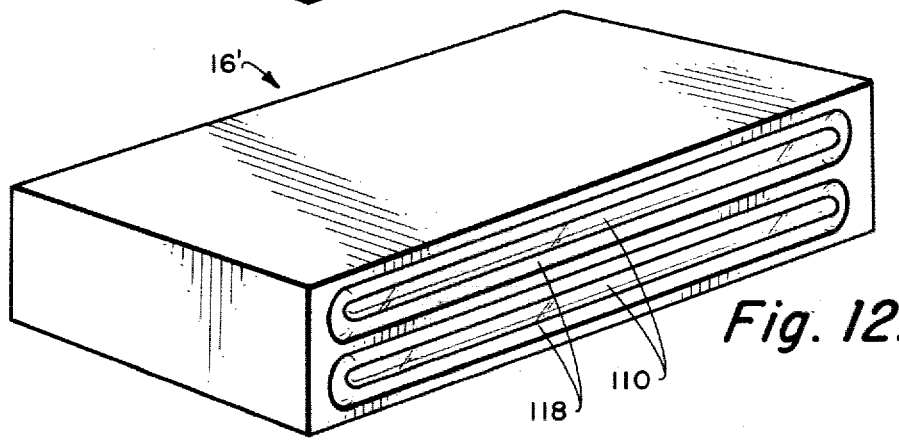
FIG. 12 is a bottom perspective view of the portion of a lamp module employing two parallel tubular lamps.

In an alternative embodiment of the lamp module 161 as illustrated in FIG. 3, which also depicts supporting the cans from above, a conventional double-ended infrared lamp 110, such as a quartz-tungsten lamp, is oriented with its filament 112 generally parallel to the cylindrical axis of the can 46. The reflector 116 in the alternative embodiment has a cavity 118 of a generally partial elliptical configuration. The filament 112 of the double-ended infrared lamp 110 is positioned generally at one of the foci of the elliptically shaped cavity 118, thereby causing the radiation generated by lamp 110 to be focused generally in the region of the other focus. The module may comprise a single lamp as per FIGS. 10 & 11 or a pair of lamps as shown in FIG. 12.

In the embodiment previously discussed (FIG. 2), air is brought in to module 16 through conduit 88 and hose 90. It is seen that such a system requires a source of compressed air either a cylinder thereof, or a compressor to deliver the requisite air under pressure from the source to the module. In those situations, where such a source of air is unavailable, I have modified the module 16's top cover plate as shown in FIG. 9, by providing a small fan 201 such as a standard so called squirrel cage fan on the top of said plate 202, to direct air downwardly through aperture 203 into the module's interior.

While such fan 201 may be battery powered, it is easier to utilize a hose 90 as a means for carrying wiring 204 to the fan 201 to power same. The modifications of the hose etc. to achieve this desired result are obviously within the skill of the routineer. Reference is made to the FIG. 9 which shows fan 201 mounted by suitable bolts to plate 202, with wiring 204 exiting from the conduit as previously discussed and attached to terminals 205. The balance of the reflector and module are shown either in fragment or are not depicted.

Figure 9:
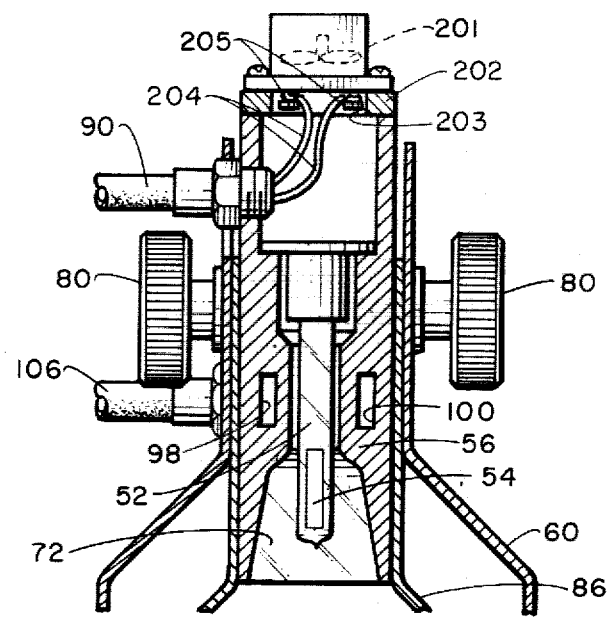
FIG. 9 is a fragmented sectional end view of a modified lamp module employable with this invention illustrating an alternative cooling means.

Obviously, the air coolant means as shown in FIG. 9 can be employed by not only the embodiment as shown in FIG. 2 which uses vertically disposed quartz halide lamps but also in conjunction with the double end infrared lamps 110 as shown in FIG. 3, whether or not such lamps are used in an embodiment as shown in FIG. 3 wherein the can passes over the lamp or in an embodiment not shown shere the can passes under the lamp. Thus, the air flow for such a modified version of FIG. 3 would follow the arrow A through air delivery slot 111 to cavity 118.

While the coolant exit 108 is depicted in FIG. 3 as being on the right side facing the viewer, it should be understood that the configuration shown therein is but an alternative embodiment to that previously described with reference to FIG. 2 wherein both the inlet and outlet for the coolant are on the same side of the module 16. Reference is made again to FIG. 16 and to FIG. 17, the latter being the flow path for coolant of the embodiment of FIG. 3. It is seen, therefore, that total cooling takes place in both embodiments.

Figure 15:
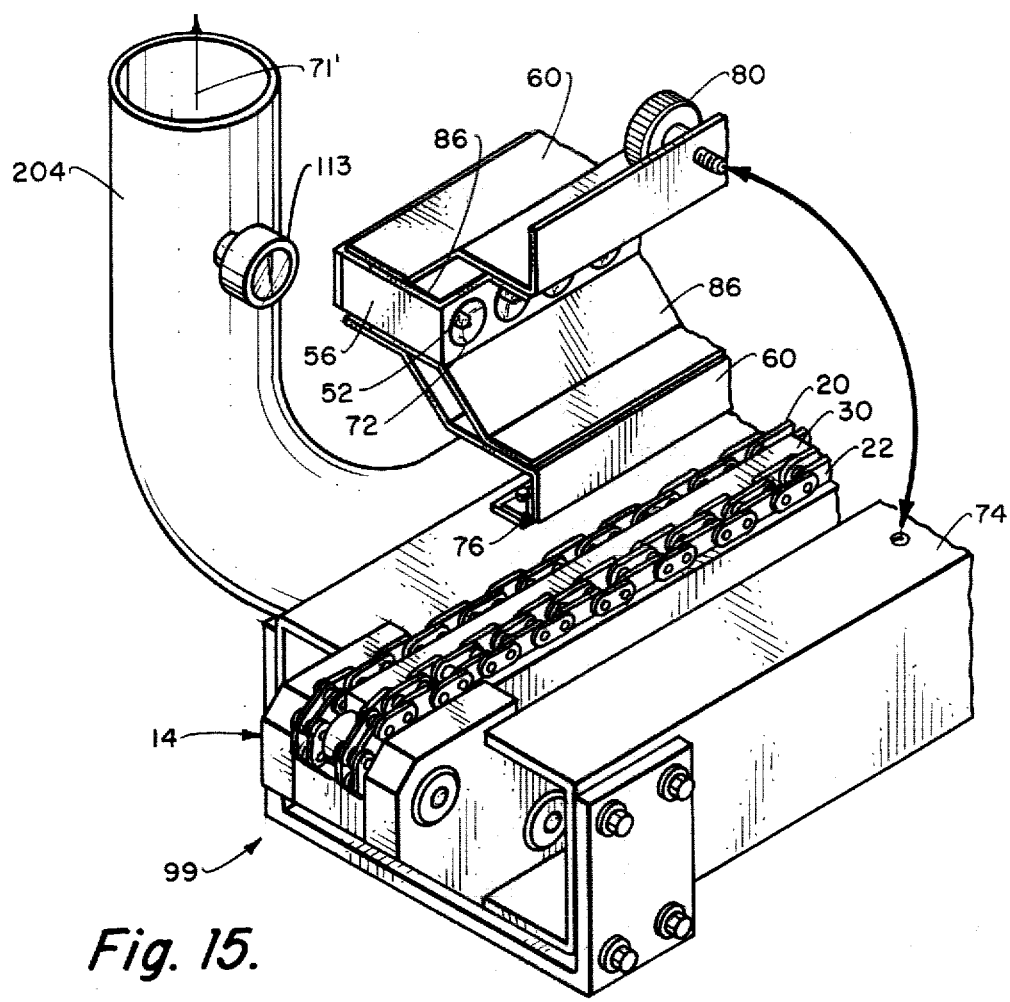
FIG. 15 is a perspective view of a portion of this invention shown open.

FIG. 15 is an end perspective view of another portion of this invention. In this Figure is seen one of the plurality of modules, said module having been oriented around hinge pin 76 as described heretofore, and the forward end of conveyor 14, designated the reach 99, to be discussed below.

Figure 18:
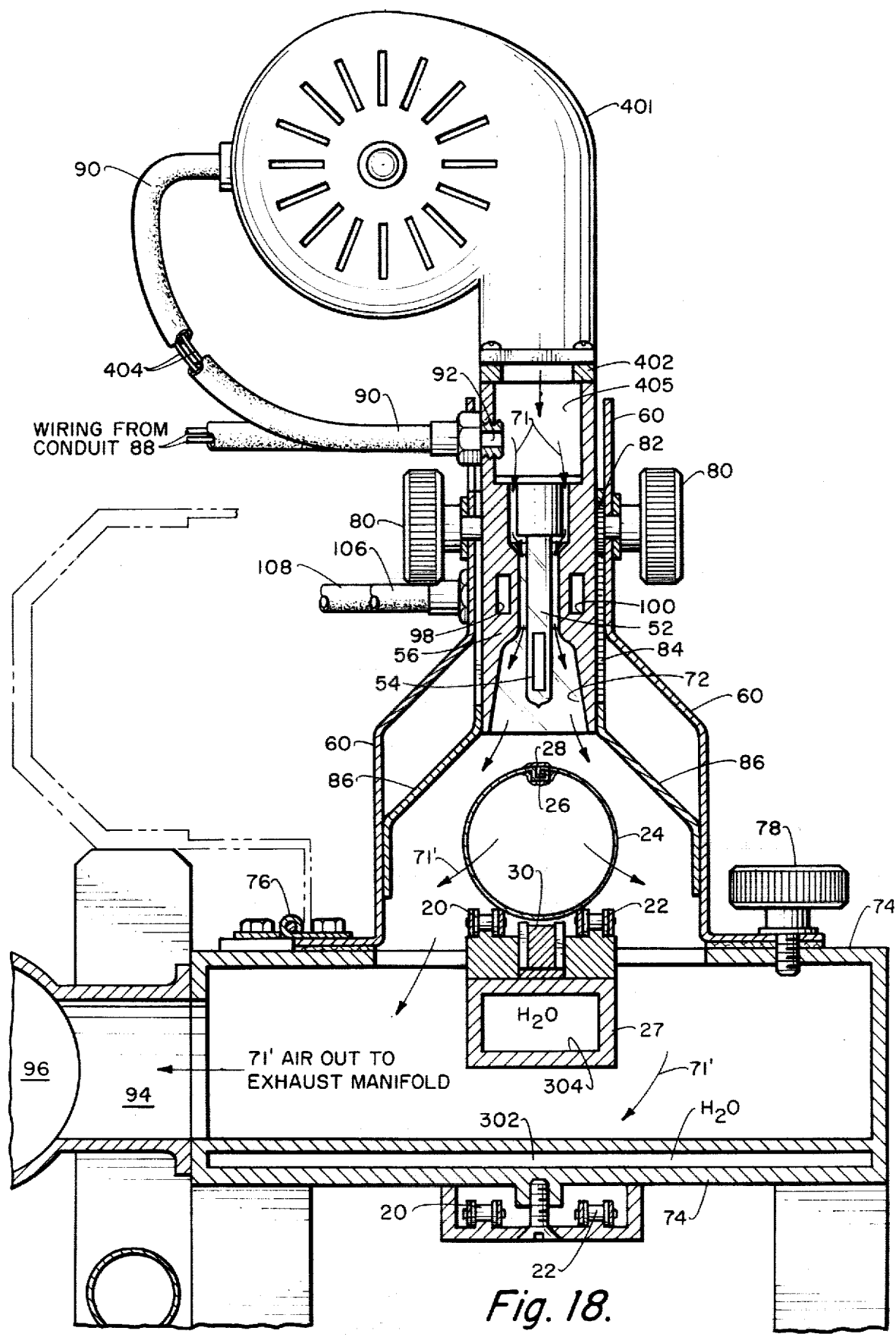
FIG. 18 is a sectional end view of another embodiment of the apparatus of this invention.

In this FIG. 15, stack 204 is connected to outlet conduit 96, not seen and which is in fluid communication with port 94, per FIG. 2 for the exhaustion of volatiles as is described in more detail elsewhere herein. Optionally a temperature or pressure guage 113 may be employed if necessary to comply with local regulations. Regardless of whether the improvement of FIG. 18 is employed or the standard mode of air introduction per FIG. 2 is employed, the exhaustion means is still a necessity.

While not visible in FIG. 15, it is within the scope of the invention to also mount an exhaust inducer in stack 204 to aid in the removal of the volatiles 71': such as inducer or exhaust fan should be able to move preferably between 650 and 1,000 CFM of exhausting gas. The inclusion of such a state of the art exhaust inducer serves to aid in the prevention of the deposition of certain types of striping compositions on the bulb(s) and in the interim of reflecting cavity 72 and 118. See FIG. 1.

Instead of a completely air cooled apparatus, other than for the water passing through the module as previously described, I have found that it may be beneficial to cool with water other parts of the apparatus. Thus reference is made of FIG. 13. Here both the support 27, which is a square tube having a duct 304 and the main channel of the furnace 74 having cooling cavity 302 therein contain water or other liquid coolant 320.

While discussion will center around an embodiment having both 302 and 304 as containing liquid coolant, it is within the scope of the invention to utilize only one of these for liquid coolant.

Figure 13:
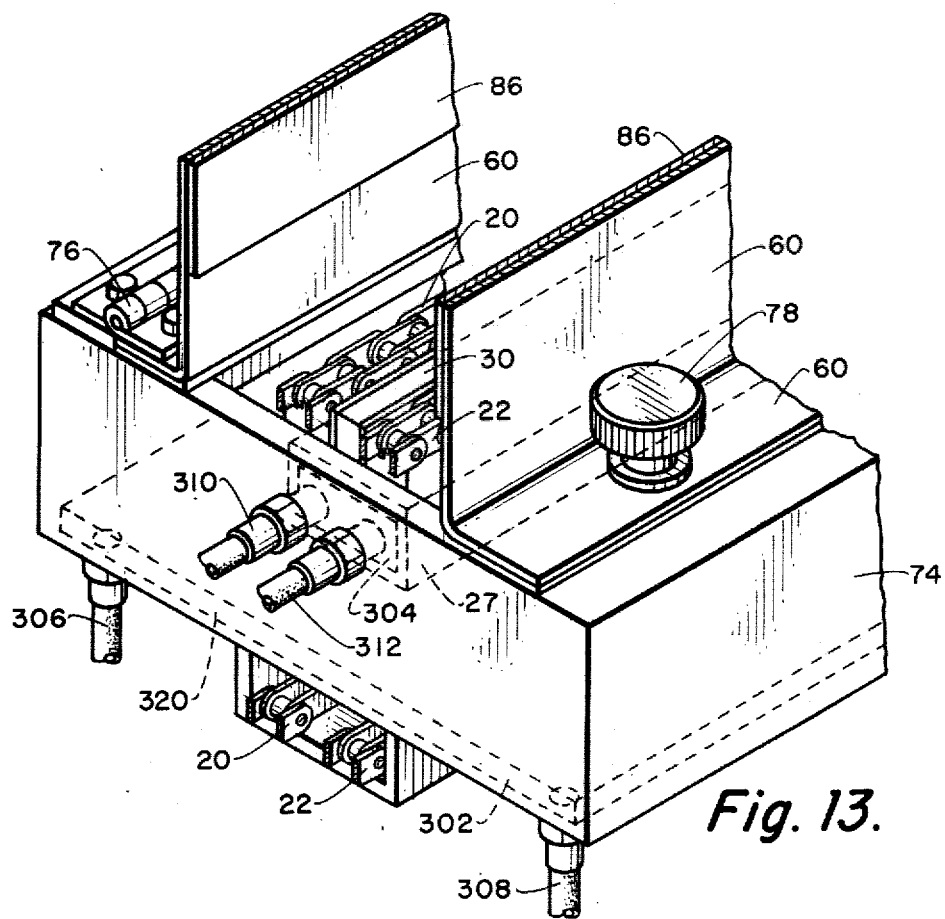
FIG. 13 is a front perspective fragmented view of the lower portion of the apparatus of this invention illustrating a cooling system for such lower portion.

FIG. 13 is a front end view of the lower portion of the furnace of this invention showing an alternate embodiment thereof. The view is fragmented, thus showing only a portion of the shroud 60, locking bolt 78 and hinge pin 76, the balance of the upper portion of the device being non-apropos to the discussion to follow.

As depicted here, water or other coolant, enters duct 304 at connection 310, flows through the duct through one or more pipes not seen and exits at outlet 312.

Figure 13A:
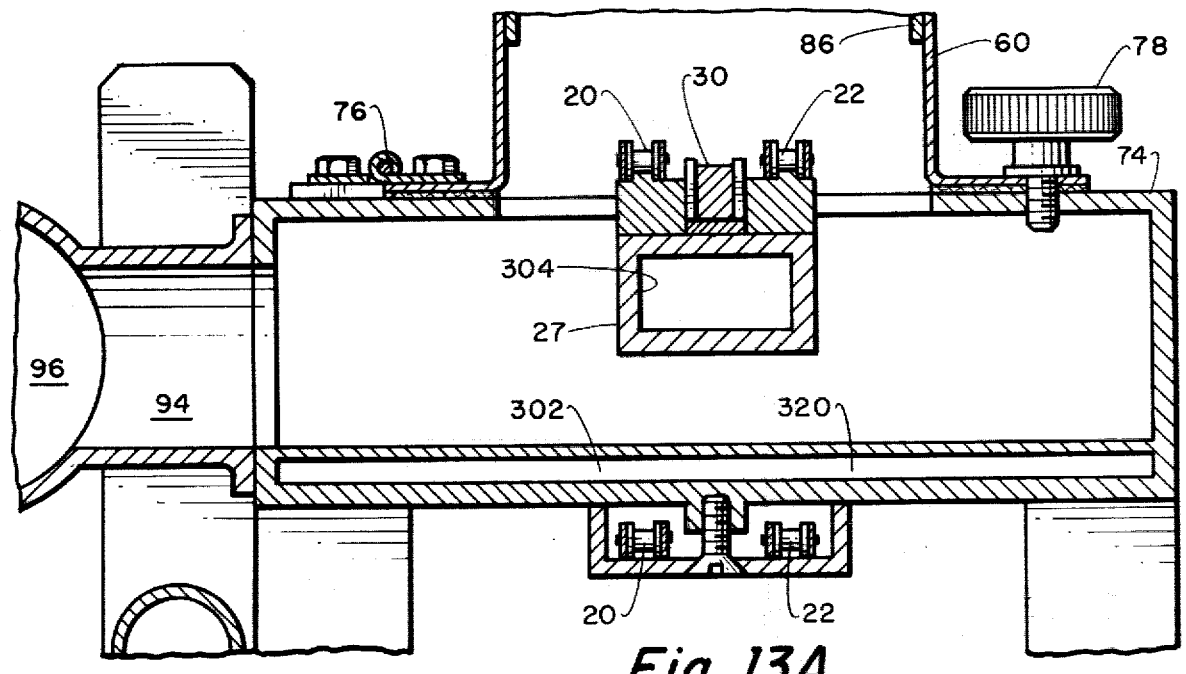
FIG. 13A is a front sectional view of an alternate embodiment of the bottom portion of the apparatus per FIG. 13.

In like manner coolant enters cavity 302 through connection 306, flows through the cavity and exits at outlet 308. Obviously other coolant flowpaths may be used such as that of FIG. 13A, wherein the entire duct 304 and entire cavity 302 are used for coolant. Here the coolant 320, entrance takes place either at one end, on the side and thus not visible in this view, with egress on the opposite end on the side also not visible; or fluid can enter at about the middle of the side and flow in both directions leftwardly and rightwardly therefrom toward the front and rear to exits also on the side, and not visible.

A block diagram of curing apparatus 10 is illustrated in FIG. 4. In one embodiment, there are six adjacent lamp modules 220, 222, 224, 226, 228 and 230 each having its own bank of individual infrared lamps. A power supply 232 provides power through transformer 234 to each module. A typicaly module such as module 220 is controlled by SCR 235 and potentiometer 236. Potentiometer 236 permits the voltage applied to module 220 to be varied. A master potentiometer 238 is coupled to all of the modules, thereby permitting a like voltage change, and thus a like change in radiation intensity to be applied to all lamp banks. Conventional current meter relays, such as meter relay 240 coupled to lamp modules 222-230, measure the current directed to the modules and, in the event that measured current falls below a preselected level, activate alarms (not shown) or open the circuits between modules and power supply 232.

Located adjacent each module is a temperature sensor, which is preferably a conventional infrared radiation temperature sensor. Temperature sensor 242 adjacent module 220 is electrically coupled to any suitable display, such as a digital voltmeter (not shown). While generally only one temperature sensor is required for curing apparatus 10, such as temperature sensor 242 located proximate the last lamp module 220, it may be desired to provide an independent temperature sensor adjacent each bank 62 of lamps 52, as shown in FIG. 4.

The conveyor motor 244 also receives power from power supply 232 and is controlled by potentiometer 246. A can counter 248 which is typically a photocell sensing device, is coupled to a display, such as a digital voltmeter 250, and senses the number of cans passing by a point. The output of counter 248 may be combined with a conventional timing circuitry (not shown) to indicate the speed of conveyor 14.

Each of the temperature sensors, such as sensor 242, and the can counter 248 are connected to a recorder 252, which may be suitable conventional analog or digital recorder, so that a time history of the can seam temperatures and the conveyor speed may be obtained.

Turning now to FIG. 18, wherein an embodiment of the invention is depicted having both water cooling at the rail bed and in the conveyor channel 74. Since like numbers represent like parts, for ease of understanding, the numbering employed with respect to the discussion of FIG. 2 is employed here as well, to avoid the necessity of repetitive discussion of similar parts.

Figure 19:
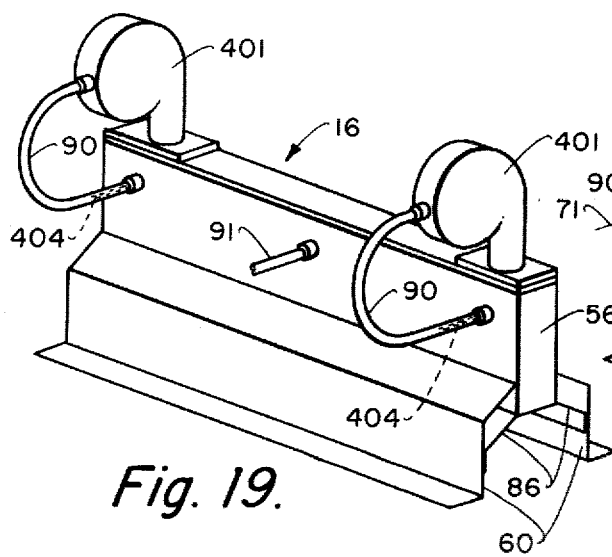
FIG. 19 is a perspective view of a portion of the embodiment of FIG. 18.
Figure 20:
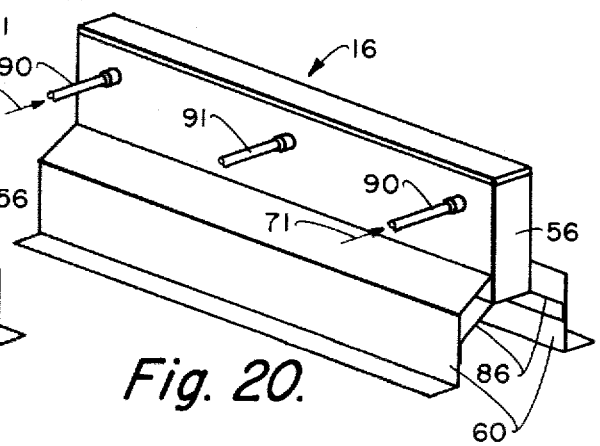
FIG. 20 is a perspective view of a portion of the embodiment of FIG. 2.

Whereas for the embodimwent of FIG. 2 which employed compressed air 71 introduced through conduit 88 into the opening 92 in the side wall of module 16 for cooling purposes, as is better illustrated in the diagrammatic side view of FIG. 20, air is introduced for cooling in the embodiment of FIG. 18 at the top of the module 16. Thus, fan 401 is mounted by adapter plate 402 which is screwed or otherwise attached to the top wall of said module. Fan 401 fluidly communicates via opening 403 with interim chamber 405 as is seen by the presence of air 71. See FIG. 19 re details.

Hose 90, which formerly served for the delivery air, by being connected at the end not attached to the module, to a source of air, is connected to the fan 401. Wiring 404 is electrically connected from the blower 401, and passes through conduit 90 to its tie-in point, not shown, with the lamps. Wiring conduit 91 takes the power from the lamp sockets back to the control panel in a known manner, which need not be discussed. By adapting this mode of power delivery, retooling costs for module 16 are avoided.

While substances such as asbestos or other insulators such as urethane foam could be used, some insulators must be avoided near food packing cans. In addition, certain insulators will absorb a maximum aount and then radiate heat ongoing. Thus water was found to be the cheapest and easiest way to avoid burnt hands from touching the cabinet and to limit elongation of the chain almost to the point of unusability wherein it forms an S loop. Even refractory material is not as easy to use and as cost effective as moving water for heat dispersion and the prevention of heat from reaching delicate electrical components.

While not specifically shown in the drawings, it is preferred to have the embodiment of FIG. 18 configured similar to the embodiment of FIG. 1 at least as far as the disposal of the volatile products 71' is concerned. Thus, the gases emitted during curing, and the air blown in 71, is to be removed via the plenum 204. See FIG. 15. Obviously though not so shown in FIG. 1, federal and most state OSHA requirements would mandate that plenum 204 be interconnected to a waste removal system, rather than merely dispensing the volatiles 71' into the environment. Plenum 204, which, is used, may contain an exhaust fan 315 mounted therein in conventional manner. Optionally guage 113 may also be employed to measure temperature or pressure of the exhaust.

Outlet conduit 96 as shown in FIG. 18 may be directed to the outside environment, or directed thereto via fluid communication with plenum 204 having the exhaust fan or another type of air mover such as an inducer mounted therein.

It is seen, therefore, that the embodiment of FIG. 18 incorporates a fan or blower means of FIG. 9 with an improved cooling system. Such embodiment may also employ the air exhausting system of FIG. 1 rather than the natural flow disposal of volatiles 71' as per the FIG. 2 embodiment.

When the blower means 401 is termed with stack 204 and exhaust fan or inducer 315, an extremely efficient air movement system for the removal of volatiles 71' is effected.

Suitable potentiometer means for the control of said blower and said fans, mountable within the control panel as shown in FIG. 1, and incorporatable into the typical operations diagram as shown in FIG. 4 are also within the scope of this invention.

OPERATION OF THE INVENTION

By considering the function of the component parts during operation, the invention as thus described can be better understood. Prior to the initiation of the curing process, the particular type of material used as weld strip is reviewed in light of the optimum curing characteristics of the substance. The operator selects the voltage to be applied to each of the lamps by adjusting the potentiometers associated with the lamp modules, such as potentiometer 236 of module 220. (see FIG. 4)

Since the voltage applied to the filament of an infrared lamp determines the intensity of radiation thereby generated and since the intensity of generated radiation is directly related to the temperature achieved by a material subjected to that radiation, it is possible to calibrate the potentiometer settings with the temperatures achieved by the cans proximate the seams. Thus preselection of the voltage independently applied to each of the mutually adjacent infrared lamp modules establishes a temperature profile along the length of curing apparatus 10. Any desired temperature profile may be selected, linear or otherwise.

After the filament voltages have been preselected in the above-described manner, the wheel 80 on each of the lamp modules is rotated so as to properly adjust the height of the lamps above the can seam.

The adjustment of wheel 80 focuses the directed radiation beam on a can segment of predetermined width near the seam. This width is generally equal to the width of the coating 28 on can seam 26 of can 24, as illustrated in FIG. 2, so that a uniform temperature is achieved across the width of coating 28. Unfocused radiation may result in uneven temperatures applied to the coating and thus uneven curing of the coating. Too narrow a beam may result in a strip of uncured polymer on both sides of the cure zone.

The speed of conveyor 14 is preselected by potentiometer 246 coupled to conveyor motor 244 to predetermine the length of exposure of can seam 26 and coating 28 (FIG. 2) to the radiation generated by the plurality of lamp modules.

The cans are advanced by conveyor 14 through the plurality of tunnel segments defined by the plurality of lamp modules. The like upward orientation of the can seams is maintained by magnetic bar 30. (see FIG. 2).

Previously it has been indicated that the cans are passed through the plurality of tunnel segments with their seams oriented upward for the FIG. 2 embodiment, and downward for the FIG. 3 embodiment of this invention. The can seams 26 and 48 respectively can be of course hand oriented by a loader person, but such a practice is not preferred due to potential human error and the interruption of an automated assembly technique.

The upward orientation once achieved is maintained by the magnetic bar 30 which serves to maintain the can in one attitude as it moves with the chains through the tunnels.

In FIG. 15 is depicted the forward end of conveyor 14 which is designated as the reach, 99. This portion extends forward of the first bank of lamps as can be seen from the side view, FIG. 1.

Figure 8:
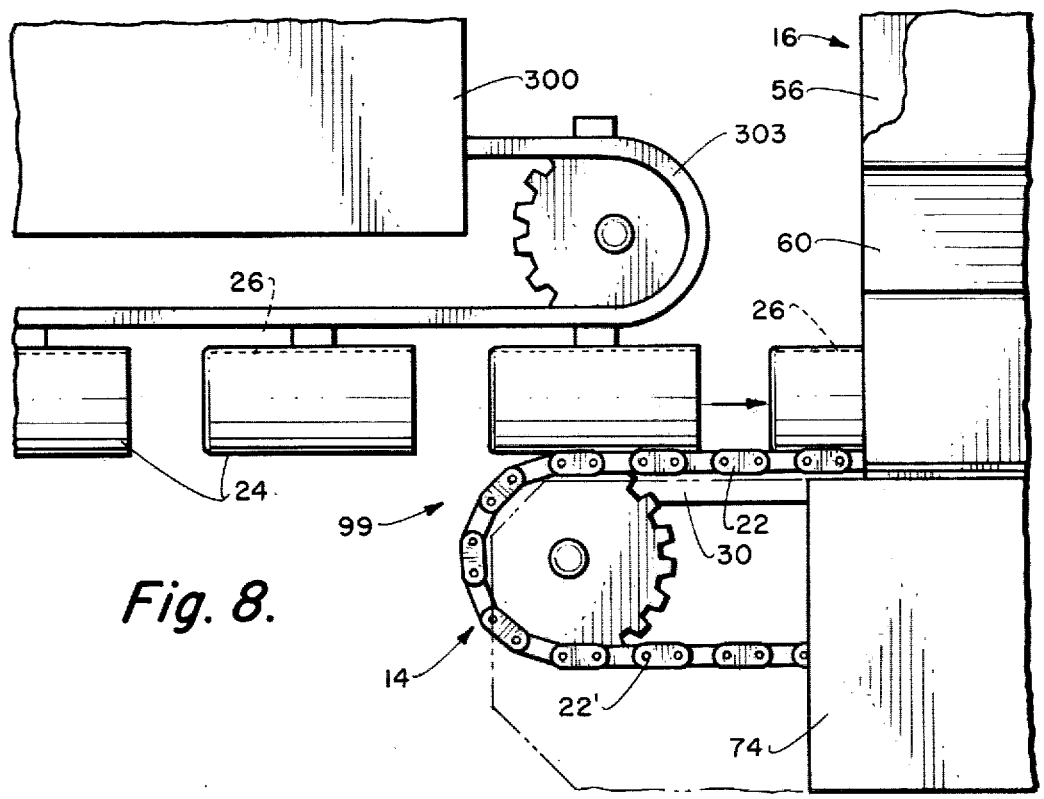
FIG. 8 is a sectional diagrammatic fragmented view of a portion of the device of this invention cooperating with a device for assembly of cans.

Reference is now made to FIG. 8, which is an illustrates the relationship between the reach 99 and other equipment utilized in automated can manufacture. Apparatus 300 is seen to be a can assembler, including a means for applying the coating to be cured. Such apparatuses are manufactured by such companies as Sudronics, and Freitag S.A., a can welder manufacturer. Apparatus 300 includes a can delivery means 303, having a magnetic bar not seen. Can 24 is suspended magnetically from such delivery means 303 with its can seam 26 facing upwardly.

Reach 99, being a part of the conveyor 14, includes chain 22, the other chain 20 not being seen, and returning chain 22'. Magnetic bar 30 is also shown. By synchronizing the speed of conveyor 14 with that of delivery means 303, since reach 99 underlies a portion of apparatus 300, one sees that the speed of the moving can 24 is maintained and that a smooth transfer takes place to the apparatus of this invention, with the seam 26 properly oriented.

As the cans pass through the radiation beams of each lamp module, the segments of the cans proximate the seam and the coating on the seam achieve a temperature proportional to the voltage applied to the lamp. After the cans exit the tunnel, the coating has been subjected to the preselected temperature levels for a predetermined period of time and curing of the coating is thus complete.

If any of the temperature sensors, such as temperature sensor 17 located near the last lamp module 16, indicates that the temperature of the can proximate the seam, and thus the temperature of the coating, is either too high or too low, any one or more of the potentiometers associated with the lamp modules may be varied to alter the intensity of radiation generated by those respective lamp modules. This results in an alteration of the temperature profile experienced by the cans moving through the plurality of radiation beams. Additionally, the master potentiometer 93 may be varied in response to the sensed temperature. This results in a like increase or decrease in the voltage applied to all of the lamp modules and thus an incremental raising or lowering of the temperature profile experienced by the cans moving through the generated radiation beams.

Similarly, if the temperature sensors indicate that the temperature of the can seam is too high or low, potentiometer 246 (FIG. 4) associated with conveyor 14 and thus the exposure duration. This technique of controlling the curing of the coating is especially suitable to coating substances having the curing characteristic whereby heating to one temperature level for one time period is generally equivalent to heating to a higher temperature level for a shorter time period.

Still further, if the readout on voltmeter 250 coupled to can counter 248 indicated an improper conveyor speed and thus an improper exposure duration, potentiometer 246 associated with motor 244 driving conveyor 14 may be varied to vary the speed of conveyor 14 and thus the duration of exposure of the can seam to the generated radiation.

While in the embodiment illustrated the temperatures sensed are displayed on meters, such as meter 252 associated with sensor 242, (FIG. 4), and the voltages applied to the lamp banks are then manually changed by potentiometers, it should be apparent that it is within the scope of the invention to provide automatic control of the lamp voltages. This may be accomplished by providing any conventional automatic control system using as reference input elements the predetermined desired can seam temperatures at various positions along the plurality of lamp modules, and as control feedback elements signals generated by the temperature sensors, such as sensor 242. Similarly, automatic control of the conveyor speed and thus the exposure duration may be provided by using the output of can counter 248. It is also seen that two step curings using a lower and then a higher heat cycle may readily be employed. Obviously liquid crystal or L.E.D. digital readout means as known to the art can be used in place of analog meters.

It is to be seen that the device of this invention has broad applicability to the curing of can "striping" compositions as supplied by the host of chemical suppliers in the field. These include Mobil Chemical, Inmont Chemical, Desoto Chemical and others. Typical heat curable compositons used for can stripings and linings include epoxy, acrylic and modified coating, and epoxy-phenolic copolymer compositions both liquid and power. Actual formulations are often proprietary and unknown to the canner, as he generally does not specify any formulation, but rather relies on the supplier to provide a lining composition compatible with the nature of the food to be canned. Determination of heat profiles for time and temperature are obviously dependent upon the exact formulation being utilized. However, it is within the skill of the art to determine them.

Obviously, any composition used for can lining and striping must be U.S. Food and Drug Administration approved. However, while air cured and ambient temperature cured polymeric compositions are known, the state of the art is such that these are not F.D.A. approved. Thus the need for the apparatus and method of this invention.

While the discussions above have pertained to striping compositions that are primarily liquid and what are considered synthetic resin compositions, it is also to be seen that the device of this invention is also suitable for curing lacquers, which while extremely fast curing are found by the industry to be quite expensive relatively and thus have gained only light acceptance. It is further to be seen that the device of this invention does not differentiate between coatings that are liquid or powder and as such is capable of curing either.

As is now apparent from the foregoing description, the present invention provides an energy-efficient method and apparatus for curing the stripe coating on a can seam which allows for flexibility in the selection of both can size and coating substance, and for rapid response when it is desired to alter either the temperatures which the can seam achieves, or the duration of exposure to those temperatures.

While the preferred embodiments of the present invention have been illustrated in detail, it should be apparent that modifications and adaptations of those embodiments will occur to those skilled in the art. For example, although the invention has been illustrated with respect to a horizontally arranged curing apparatus, inclined or vertically arranged can conveyors may be employed if desired. In such installations, the lamp modules should be arranged in such a manner that the can seams face the radiation generated by the lamp modules as each can passes through a given module. However, it is to be explicitly understood that such modifications and adaptations are within the sphere and scope of the present invention as set forth in the following claims.

In retrospect it is to be seen that the apparatus and process of this application constitute the first use of radiant energy to heat all or preferably only a portion of a welded can to cure the coating strip disposed thereon. The technique of this application unlike prior art apparatuses and processes is readily adjustable to accomodate different size cans and different coating compositions. Different curing requirements, both as to time of exposure and temperature of exposure, including the ability to cure in a multistep multitemperature cycle, can be accomodated due to the plurality of controllable variables built into the apparatus and therefore, by definition, as needed, into the process. One can control the lamp to subject distance by raising or lowering the module and its fixed bulb relative to the can. The speed of the conveyor is adjustable, and the intensity of the lamp(s) for each individual module (bank of lamps) can be controlled due to the placement of sensors at the end of each tunnel segment—a tunnel segment being one module.

It should also be emphasized that unlike gas or coal fired furnaces which must heat the entire can, the apparatus of this invention permits operator to focus the infrared rediation on an area as small as $\frac{3}{8}$" to 1", the normal diameter of a curable stripe merely by using ordinary optical and other physics principles when configuring the reflector cavity such as 72 or 118.

The configuration of the cavity is seen to vary with the type of bulb being employed. Note for instance FIGS. 2 and 3. When designing the cavity, one must bear in mind the fact that the lamps employed here have linear filaments whereby they emit a 360° radius radial heat pattern. Therefore, one skilled in the art must configure the reflective colony to capture as much as possible of the light-heat from the various bulbs of the marketplace and to reflect it (focus it) to the desired location on the workpiece, i.e. the stripe to be cured. Obviously, the energy savings available due to heating only a work zone on a can having only a narrow stripe to be cured, is readily seen.

While disclosed primarily for use in the environment of the curing of can seam coating compositions, as cans move along a conveyor, it is also to be seen that infrared module 16 can be used for the heat curing of other substrates, preferably as they move along a conveyor. Thus, the lamp module need not actually be hinged to a conveyor means, it must only be in close abutting relationship therewith to define a work tunnel for the transport of substrates therethrough, along which said substrates having polyerizable coatings will cure coatings of said substrates. Thus, the lamp module 16 could be used for the curing of epoxy coated metal parts, both small and large, such as for expensive porch furniture tubing among other useful articles of commerce and industry.

What is claimed is:

1. In a can assembly line of the type having means for forming rectangularly shaped sheets of can material into cylindrical tubes, means for welding the ends of the sheets together to form seams, and coating means for applying a stripe of coating to the seams after welding, an apparatus for curing the coating on the can seams comprising:
   (a) means for conveying the cans successively in a generally linear direction generally parallel to the axis of the cylindrical cans, said conveyor means having means for maintaining the position of the seams in like orientation as the cans are moved;
   (b) a plurality of serially arranged mutually adjacent lamp modules, each of said modules further comprising:
      (I) at least one infrared lamp for generating infrared radiation;
      (II) a reflector surrounding said lamp for directing the radiation into a beam; and having a duct therein for the passage of collant; and
      (III) a shroud covering said reflector and said lamp, said shroud being adapted for operative connection to the conveyor means and defining a generally enclosed tunnel with the conveyor means for the moving cans, wherein said shroud comprises an outer member, an inner moveable member covering said reflector and said lamp, and means for moving said inner member relative to said outer member, whereby the separation distance between the lamp and the moving cans may be varied,
      (IV) hinge means providing a hinged connection between said shroud and the conveyor means, whereby said shroud may be rotated about the hinge axis for access to said lamp and the conveyor means,
   said infrared lamp module being adapted for connection to a coolant supply whereby heat generated by said lamp is dissipated by coolant passing through said duct.

2. An apparatus according to claim 1 including means for sensing the temperature of the cans proximate the seams after the cans have been subjected to radiation, said temperature sensing means being coupled to said radiation intensity varying means, whereby the intensity of radiation directed to the cans proximate the seams is varied in response to said sensed temperature.

3. An apparatus according to claim 1 including means for sensing the temperature of the cans proximate the seams after the cans have been subjected to radiation, said temperature sensing means being coupled to said exposure duration varying means, whereby the duration of exposure of the can seams to the radiation is varied in response to said sensed temperature.

4. The apparatus of claim 1 further including means for maintaining the can seams oriented toward the lamps.

5. An apparatus according to claim 1 including means for introducing air between said lamp and the cans to remove gases produced by the heated coatings.

6. An apparatus according to claim 5 wherein said cooling means further comprises conduit means surrounding said lamp and means for introducing coolant through said conduit means to cool said lamp.

7. An apparatus according to claim 1 including means coupled to said can moving means for varying the speed with which the cans move through said radiation beam, whereby the duration of exposure of the can seams to the radiation is controlled.

8. An apparatus according to claim 3 including means coupled to said lamp module for varying the voltage applied to the lamp, whereby a variation in lamp voltage varries the intensity of radiation generated by said lamp and therewith the temperature achieved by the can seams when said lamp is energized.

9. An apparatus according to claim 1 including means electrically coupled to all of said lamp modules for varying the voltage applied to all of said lamp modules by a like amount, whereby the temperature achieved by the can seams and the coating thereon as the cans move through the radiation generated at each of said lamp modules is varied by a predetermined temperature increment.

10. An apparatus according to claim 1 wherein said cooling means further comprises conduit means surrounding each of said lamps and means for introducing coolant through said conduit means.

11. An apparatus according to claim 1 including means for removing gases produced by the coating subjected to the radiation.

12. The apparatus of claim 4 and wherein the means for maintaining the can seams oriented comprises a magnetic bar.

13. The apparatus of claim 4 and wherein the means for supporting the cans comprises a conveyor mechanism.

14. The apparatus of claim 1 further including blower means for providing air proximate said lamp for disposing of gases generated during the curing of the coating applied to said can seam.

15. The apparatus of claim 14 also including gas exhausting means for removing gases disposed by said blower means.

16. An apparatus according to claim 11 wherein the gas removing means comprises at least one blower mounted on said module for directing forced air through said module to said can seam.

17. The apparatus of claim 16 further including gas exhausting means proximate said can seam for withdrawing said gases and said air.

18. The claim 1 apparatus plus means coupled to said conveyor or means to vary the speed of said conveyor means and therewith the duration of exposure of the can seams to the infrared radiation.

19. The device of claim 1 further including:
means coupled to each of said lamp modules for independently varying the voltage to said lamps to correspondingly vary the intensity of radiation generated by said lamps and therewith the temperature of the can seams when said lamps are energized.

20. The device of claim 1 further including cooling means proximate each of said lamp modules operatively connected to said modules for cooling said modules.

21. An infrared lamp module adapted for use in curing coatings applied to substrates as the substrate moves along a conveyor means, the module comprising:
(a) a shroud, open on one side
(b) means for positioning the shroud's open side in position along the conveyor means' length to define a generally enclosed tunnel with the conveyor means, said shroud adapted for operative connection to said conveyor means,
(c) infrared lamp means mounted inside the shroud for generating infrared radiation, and
(d) a reflector mounted inside the shroud and positioned to receive radiation from the infrared lamp means and to direct said radiation toward said conveyor means.

22. The infrared lamp module of claim 21 including means for cooling the infrared lamp means during operation thereof, and further including means removing gases produced in the process of curing the coatings with the infrared radiation.

23. The infrared lamp module of claim 21 and further including means for adjusting the distance between the infrared lamp means and the conveyor means.

24. The infrared lamp module of claim 23 and wherein the infrared lamp means comprises a bank of infrared lamps positioned in the shroud with their longitudinal axis perpendicular to the longitudinal axis of the substrate.

25. The infrared lamp module of claim 23 and wherein the infrared lamp means comprises at least one infrared lamp positioned in the shroud with each lamp's longitudinal axis parallel to the longitudinal axis of the can.

26. The infrared lamp module of claim 21 wherein the shroud is mounted above the conveyor means, on said conveyor means.

27. The infrared lamp module of claim 21 and wherein the shroud is mounted such that the infrared lamp means is below the conveyor means.

28. The infrared lamp module of claim 26 and wherein the shroud is hingedly mounted to the conveyor means whereby the shroud may be rotated about the hinge axis for access to the infrared lamp means and the conveyor means.

29. The infrared lamp module of claim 25 and wherein the reflector comprises a body of material having a concave cavity and each infrared lamp is disposed at least partially within said cavity.

30. The infrared lamp module of claim 29 and wherein the cavity is both elliptical and concave.

31. The infrared lamp module of claim 29 and wherein the reflector has a duct adapted to be connected to a coolant supply, whereby heat generated by said lamp means is dissipated by coolant passing through said duct.

32. The infrared lamp module of claim 31 and wherein the reflector has a passageway extending into said cavity and adapted to be connected to an air supply under pressure for introducing air into said cavity and adapted to be connected to an air supply under pressure for introducing air into said cavity for removing gases produced during the curing.

33. The infrared lamp module of claim 21 and wherein the shroud includes an outer member and an inner member movably mounted on said outer member and said reflector and said infrared lamp means are fixedly mounted relative to said inner member, whereby said reflector and infrared lamp means can be adjusted relative to said conveyor means.

34. An infrared lamp module adapted for directing infrared radiation to cans being advanced along a can assembly line by conveyor means, said module comprising:
(a) at least one infrared lamp for generating infrared radiation;
(b) a reflector surrounding said lamp for directing the radiation into a beam; and having a duct therein for the passage of coolant; and
(c) a shroud covering said reflector and said lamp, said shroud being adapted for operative connection to the conveyor means and defining a generally enclosed tunnel with the conveyor means for the moving cans, wherein said shroud comprises an outer member, an inner moveable member covering said reflector and said lamp, and means for moving said inner member relative to said outer member, whereby the separation distance between the lamp and the moving cans may be varied,
(d) hinge means providing a hinged connection between said shroud and the conveyor means, whereby said shroud may be rotated about the hinge axis for access to said lamp and the conveyor means
said infrared lamp module being adapted for connection to a coolant supply whereby heat generated by said lamp is dissipated by coolant passing through said duct.

35. An apparatus according to claim 34 wherein the infrared lamp module is adapted for connection to an air supply and wherein said reflector has a passage therein providing communication between the air supply and the moving cans, whereby gases produced by the heated cans is removed by air moving past the cans.

* * * * *